(12) United States Patent
Vince

(10) Patent No.: US 11,664,847 B2
(45) Date of Patent: May 30, 2023

(54) ELECTRIC FILTERING DEVICE

(71) Applicant: BRITISH TELECOMMUNICATIONS PUBLIC LIMITED COMPANY, London (GB)

(72) Inventor: James Vince, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 0 days.

(21) Appl. No.: 17/782,384

(22) PCT Filed: Nov. 23, 2020

(86) PCT No.: PCT/EP2020/083105
§ 371 (c)(1),
(2) Date: Jun. 3, 2022

(87) PCT Pub. No.: WO2021/110463
PCT Pub. Date: Jun. 10, 2021

(65) Prior Publication Data
US 2023/0010666 A1 Jan. 12, 2023

(30) Foreign Application Priority Data

Dec. 5, 2019 (GB) .................................. 19213856

(51) Int. Cl.
*H04B 3/46* (2015.01)
*H04B 15/00* (2006.01)
*H04L 12/64* (2006.01)

(52) U.S. Cl.
CPC ............. *H04B 3/46* (2013.01); *H04B 15/005* (2013.01); *H04L 2012/6478* (2013.01)

(58) Field of Classification Search
CPC ........ H04B 3/46; H04B 15/005; H04B 15/02; H04B 15/00
See application file for complete search history.

(56) References Cited

U.S. PATENT DOCUMENTS

| 5,550,916 A | 8/1996 | Daoud |
| 6,229,890 B1 | 5/2001 | Kerr et al. |

(Continued)

FOREIGN PATENT DOCUMENTS

| EP | 1 527 503 | 5/2014 |
| JP | 09-130187 | 5/1997 |

(Continued)

OTHER PUBLICATIONS

Secure Cable by Threading Tie Through Guides, AMAZON document (https//www.amazon.co.uk/1STec-Telephone-Internal-Junction-Repairing/dp/B07Q8CMKT5/ref=sr_1_3?crid=2VV2Z1R23DD0O&keywords=bt77a&qid=1646749100&sprefix=bt77a%2Caps%2C90&sr=8-3&th=1) Date First Available Apr. 2, 2019 (2 pages).

(Continued)

*Primary Examiner* — Khanh C Tran
(74) *Attorney, Agent, or Firm* — Nixoon & Vanderhye P.C.

(57) ABSTRACT

An electric filtering device (200) for filtering Repetitive Electrical Impulse Noise (REIN) in a fixed-access telecommunications network (100), the electric filtering device comprising: a REIN filter (210), said REIN filter comprising a first electrical contact (220-1) and a second electrical contact (220-2) for connecting to a telecommunications cable (140) of the fixed-access telecommunications network; an enclosure (230) for enclosing the REIN filter; an input (250-1) and an output (250-2), formed as part of the enclosure, each for receiving a telecommunications cable (140) so as to be connected to the first and the second electrical contacts, thereby to connect the REIN filter to the fixed-access telecommunications network; a coupling formation (260) for coupling the electric filtering device to an external distribution point (130) for a telecommunications cable of the fixed-access telecommunications network.

18 Claims, 2 Drawing Sheets

(56) References Cited

U.S. PATENT DOCUMENTS

Figure 1:
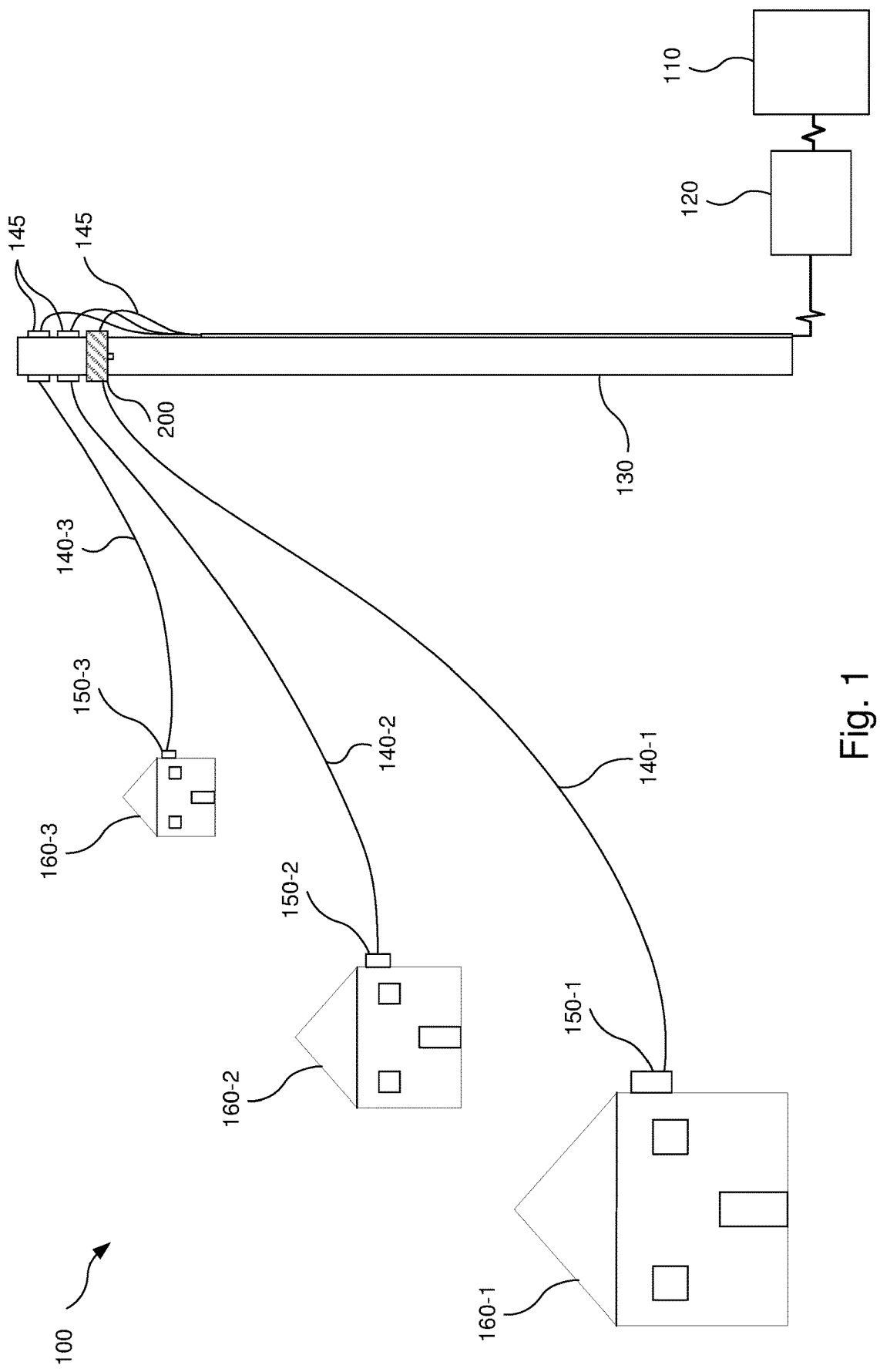

| | | | |
|---|---|---|---|
| 7,589,277 | B2 | 9/2009 | Kessler et al. |
| 8,406,413 | B2 | 3/2013 | Halverson et al. |
| 8,638,809 | B1* | 1/2014 | Goodson .................. H04L 1/20 |
| | | | 370/441 |
| 8,867,234 | B2 | 10/2014 | Heimann et al. |
| 2002/0071264 | A1 | 6/2002 | Delvart |
| 2006/0078044 | A1* | 4/2006 | Norrell ................. H04L 5/0046 |
| | | | 375/222 |
| 2006/0178035 | A1 | 8/2006 | Shimirak |
| 2010/0034111 | A1* | 2/2010 | Rosenberg ........... H04M 11/062 |
| | | | 370/252 |
| 2014/0098705 | A1* | 4/2014 | Chow .................. H04M 3/304 |
| | | | 370/254 |

FOREIGN PATENT DOCUMENTS

| | | |
|---|---|---|
| KR | 20-0343275 | 3/2004 |
| KR | 10-2015-0043829 | 4/2015 |

OTHER PUBLICATIONS

Secure Cable by Threading Tie Through Guides, AMAZON document (https//www.amazon.co.uk/1STec-Telephone-Internal-Junction-Repairing/dp/B07Q8CMKT5/ref=sr_1_3?crid=2VV2Z1R23DD0O&keywords=bt77a&qid=1646749100&sprefix=bt77a%2Caps%2C90&sr=8-3&th=1) retrieved Aug. 5, 2022 (2 pages).

"Rein Rein go away!", Jun. 2, 2016, XP055696350, Retrieved from the Internet: https://www.run-it-direct.co.uk/blog/rein-rein-go-away-12.php [retrieved on May 18, 2020] (2 pages).

Combined Search and Examination Report for GB1917796.3, dated May 4, 2020 (7 pages).

"DSL Line Conditioners—Outdoor POTS Splitter", Suttle Solutions (1 page).

Exam Report for GB1917796.3, dated Jan. 10, 2022 (5 pages).

Exam Report for GB1917796.3 dated Mar. 9, 2022 (Pending Submission).

Extended European Search Report for 19213856.8, dated Jun. 2, 2020 (9 pages).

"Run-It-District: "BT 80B RF3 Junction Box With REIN Filter"", Jun. 2, 2016, Retrieved from the internet: https://www.run-it-direct.co.uk/bt-junction-boxes/BT80BRF3/ [retrieved on May 18, 2020] (2 pages).

International Search Report and Written Opinion off the ISA for PCT/EP2020/083105, dated Feb. 11, 2021 (13 pages).

Examination Report under Section 18(3) dated Mar. 9, 2022 issued for GB1917796.3 (5 pages).

* cited by examiner

ELECTRIC FILTERING DEVICE

This application is the U.S. national phase of International Application No. PCT/EP2020/083105 filed Nov. 23, 2020 which designated the U.S. and claims priority to EP 19213856.8 filed Dec. 5, 2019, the entire contents of each of which are hereby incorporated by reference.

FIELD OF INVENTION

The present invention relates to an electric filtering device for a telecommunications network, and in particular an electric filtering device for filtering Repetitive Electrical Impulse Noise (REIN) and Single High level Impulse Noise Event (SHINE).

BACKGROUND

Repetitive Electrical Impulse Noise (REIN) and Single High level Impulse Noise Event (SHINE) interfere with fixed-access telecommunication networks and may occur due to electrical induction in metal telecommunications cables from electrical equipment nearby to such cables, and in particular from electrical equipment within a customer's premises. For example, sources of REIN may include high-voltage power lines, microwaves, fairy lights and televisions, especially where such electrical equipment is faulty.

The effects of REIN (and SHINE) on fixed-access telecommunication networks can be mitigated by installing a REIN (or SHINE) filter as part of the network, such filters are typically installed within the premises where the interference is being generated and/or within the customer premises that is being affecting by REIN, and in particular as part of a Digital Subscriber Line (DSL) faceplate. Accordingly, to solve the problem of interference in a fixed-access telecommunication network due to REIN requires access to the premises where the interference is being caused and/or experienced; this is not, however, always possible or convenient.

Accordingly, it is an aim of the present invention to at least alleviate the aforementioned problems.

STATEMENTS OF INVENTION

According to a first aspect of the present invention, there is provided an electric filtering device for filtering Repetitive Electrical Impulse Noise (REIN) in a fixed-access telecommunications network, the electric filtering device comprising: a REIN filter, said REIN filter comprising a first electrical contact and a second electrical contact for connecting to a telecommunications cable of the fixed-access telecommunications network; an enclosure for enclosing the REIN filter; an input and an output, formed as part of the enclosure, each for receiving a (respective) telecommunications cable so as to be connected to the first and the second electrical contacts, thereby to connect the REIN filter to the fixed-access telecommunications network; and a coupling formation for coupling the electric filtering device to an external distribution point for a telecommunications cable of the fixed-access telecommunications network. Preferably, the distribution point is outside of a customer premises.

Preferably, the telecommunications cable is in the form of a twisted metal pair wire. Preferably, the first electrical contact and the second electrical contact are for connecting to separate telecommunications cables.

Preferably, the first electrical contact and the second electrical contact are for directly connecting to a telecommunications cable or via an electrical connector. Preferably, the electric filtering device is connected in-line with a telecommunications cable.

Preferably, said distribution point is configured to distribute the telecommunications cable to a customer premises. Preferably, the telecommunications cable serves a single customer premises, and more preferably only a single customer premises. Preferably, the telecommunications cable is a customer-side cable and/or a distribution-side cable, and more preferably the customer-side cable is in the form of a dropwire. Optionally, the coupling formation is an engagement formation. Optionally, the coupling formation is coupled to, or integrally formed as part of, the enclosure. Optionally, the coupling formation is a: cable; clip; tether; screw and/or bolt fixture; clamp; and/or hook. Preferably, the distribution point is an outside plant. Optionally, the distribution point is an underground vault. Preferably, the distribution point is a telecommunications pole. Preferably, the enclosure is an overhead enclosure for a telecommunications pole.

Preferably, the first and/or the second electrical contact/s is/are configured to couple with a (respective) twisted metal pair wire. Preferably, the first and/or the second electrical contacts is/are configured to couple with a twisted metal pair wire by means of a crimp coupling. Preferably, the first and/or the second electrical contact/s comprise/s a twisted metal pair wire. Preferably, the twisted metal wire pair is at least 50 mm in length, more preferably at least 100 mm in length, and still more preferably at least 150 mm in length. Optionally, the first and/or the second electrical contacts conform with British Telecommunications Specification CW1171. Optionally, the first and/or the second electrical contact/s comprise at least a 0.5 mm exposed metal conductor.

Preferably, the input and the output are in the form of apertures, and wherein the input and the output each further comprise a seal for sealing the apertures when having received a telecommunications cable. Optionally, the seal is formed of rubber. Optionally, the seal is a washer. Optionally, the seal is further configured to engage the telecommunications cable. Optionally, the seal is dimensioned so as to form a compression fitment for the telecommunications cable.

Preferably, the input and/or the output further comprise/s an electrical connector, and wherein each electrical connector is electrically connected to the first or second electrical contact. Optionally, the electrical connector is in the form of a crimp connector or a plug.

Preferably, the input and the output are arranged on distal sides of the enclosure. Alternatively, the input and the output may be arranged on the same side of the enclosure, and may be adjacent to one another.

Preferably, the first electrical contact is arranged to receive a telecommunications cable from a customer premises; and wherein the second electrical contact is arranged to receive a telecommunications cable from a distribution-side cable of the fixed-access telecommunications network.

Preferably, the first electrical contact and the second electrical contact are arranged on distal sides of the REIN filter. Alternatively, the first electrical contact and the second electrical contact are arranged on the same side of the REIN filter, and may be adjacent to one another.

Preferably, the enclosure is in the form of a waterproof enclosure. Preferably, the enclosure complies with IP65, IP66 or IP67. Optionally, the enclosure is rendered waterproof when the electric filtering device is in situ, that is, at least, when the REIN filter is connected to the telecommunications cables as received via the input and the output.

Preferably, the enclosure comprises two separable parts, and wherein said parts comprise complementary engagements for engaging said two separable parts together. Preferably, the enclosure (for example, each or either separable part/s) comprise a sealing member for forming a seal between the separable parts. Optionally, the engagements are in the form of a: clip; screw and/or bolt fixture; clamp; and/or friction fitment.

Preferably, the enclosure further comprises a mechanical shock-absorbing member for protecting the REIN filter from mechanical shock. Optionally, the enclosure further comprises a mechanical shock-isolating member for isolating the REIN filter from mechanical shock. Optionally, the mechanical shock-absorbing and/or shock-isolating member/s is/are in the form of: a pneumatic/air isolator; a spring dampener; a compressible and/or elastomeric material, such as rubber or foam, buffer or mount; and/or a wire-suspension isolator.

Preferably, the electric filtering device further comprises an anchor point for tethering a strength member of a telecommunications cable. Preferably, the anchor point is formed as part of the enclosure, and may arranged within the enclosure or externally to the enclosure. Preferably, the enclosure is rigid.

Preferably, the enclosure is formed of a UV-resistant material. Optionally, the enclosure is formed of a temperature-resistant material. Preferably, the enclosure is formed of plastic, is formed of a non-metallic material, or is formed of an electrical insulator. Optionally, the enclosure is formed of a high-density plastic, metal and/or a composite material.

Preferably, the REIN filter is operable at a DC voltage of up to 60 Volts and a current of up to 350 milliAmps. Preferably, the differential mode impedance of the REIN filter is at least 500, more preferably at least 1000, and still more preferably at least 1500. Preferably, the differential mode loss of the REIN filter is less than 1.0 dB at frequencies up to 100 MHz, preferably less than 2.0 dB for frequencies between 100 MHz and 200 MHz. Preferably, the common mode loss of the REIN filter is greater than 20 dB between 200 kHz and 20 MHz.

Preferably, the electric filtering device further comprises a Single High level Impulse Noise Event filter for connection to the telecommunications network.

According to another aspect of the invention, there is provided an external distribution point for a fixed-access telecommunications network, the external distribution point comprising: a customer-side telecommunications cable; a distribution-side telecommunications cable; and an electric filtering device according to any preceding claim, wherein the customer-side telecommunications cables is electrically connected to the distribution-side telecommunications cable via said electric filtering device. Preferably, the electric filtering device is coupled or engaged to the external distribution point. Optionally, the external distribution point comprises a plurality of electric filtering devices, customer-side telecommunications cables and distribution-side telecommunications cable, and wherein each electric filtering devices is arranged electrically to connect a single pair of customer-side and distribution-side telecommunications cables.

The invention includes any novel aspects described and/or illustrated herein. The invention also extends to methods and/or apparatus substantially as herein described and/or as illustrated with reference to the accompanying drawings. The invention is also provided as a computer program and/or a computer program product for carrying out any of the methods described herein and/or for embodying any of the apparatus features described herein, and a computer-readable medium storing thereon a program for carrying out any of the methods and/or for embodying any of the apparatus features described herein. Features described as being implemented in hardware may alternatively be implemented in software, and vice versa.

The invention also provides a method of transmitting a signal, and a computer product having an operating system that supports a computer program for performing any of the methods described herein and/or for embodying any of the apparatus features described herein.

Any apparatus feature may also be provided as a corresponding step of a method, and vice versa. As used herein, means plus function features may alternatively be expressed in terms of their corresponding structure, for example as a suitably-programmed processor.

Any feature in one aspect of the invention may be applied, in any appropriate combination, to other aspects of the invention. Any, some and/or all features in one aspect can be applied to any, some and/or all features in any other aspect, in any appropriate combination. Particular combinations of the various features described and defined in any aspects of the invention can be implemented and/or supplied and/or used independently.

As used throughout, the word 'or' can be interpreted in the exclusive and/or inclusive sense, unless otherwise specified.

Figure 2:
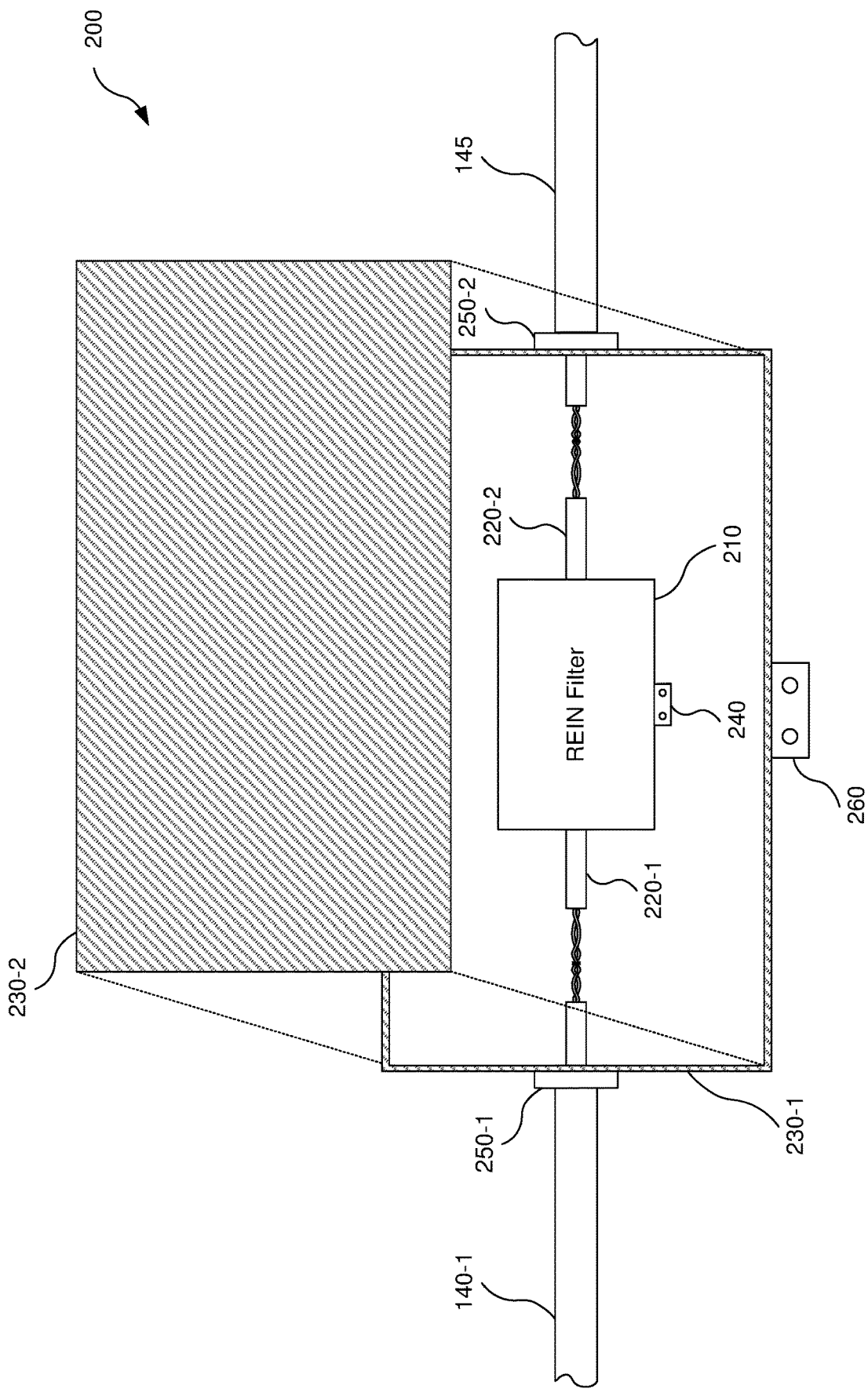

The invention extends to an electric filtering device and a distribution point as described herein and/or substantially as illustrated with reference to the accompanying drawings. The present invention is now described, purely by way of example, with reference to the accompanying diagrammatic drawings, in which:

FIG. 1 is a schematic diagram of a portion of a fixed-access telecommunications network, in which the telecommunications network comprises an electric filtering device; and FIG. 2 is a detailed view of the electric filtering device.

SPECIFIC DESCRIPTION

FIG. 1 is a schematic illustration of a fixed-access telecommunications network 100, such as for providing telephone services and a Digital Subscriber Line (DSL) broadband connection.

The fixed-access telecommunications network 100 comprises a core network 110, to which a Primary Cross-connection Point (PCP) 120 is connected (for example via a Main Distribution Frame in an exchange). The PCP 120 is in turn connected, via distribution-side cables 145, to an outside plant Distribution Point (DP) 130 in the form of a telecommunications pole. A plurality of customer-side telecommunications cables in the form of dropwires 140 extending from the DP 130 to individual junction boxes 150-1, 150-2, 150-3 of individual customers' premises 160-1, 160-2 and 160-3 (respectively). In this way each customer premises 150 is served with network connectivity via their junction box 150, an appropriate dropwire 140, the DP 130, the PCP 120 and the network core 110. The dropwires 140 and/or the distribution-side cables 145 carry electrical signals through an electrical conductor, and in particular through Twisted Metal Pair (TMP) wires.

In the example of FIG. 1, a source (not shown) of Repetitive Electrical Impulse Noise (REIN) causes interference on the telecommunications network 100 to the detriment of a data connection over the network 100 that serves customer premises 160-1. Customer premise/s 160-2 and/or 160-3 may or may not also be affected.

In order to mitigate the effect of the REIN on customer premises 160-1 the telecommunications network 100 is provided with an electric filtering device 200.

As shown in more detail in FIG. 2, which is a schematic illustration of the electric filtering device 200, the electric filtering device 200 comprises, in overview: a REIN filter 210; electrical contacts 220 for connecting the REIN filter 210 to the telecommunication network 100; an enclosure 230 for enclosing the REIN filter 210; and an input 250-1 and an output 250-2, each of which are formed as part of the enclosure, to enable connection of the REIN filter 210 to the telecommunication network 100.

The REIN filter 210 is an electronic signal processing filter that is configured to reduce the intensity of noisy repetitive electrical impulses over the fixed-access telecommunications network 100, which are typically manifest at a spectral frequency between 600 kHz and 700 kHz.

Accordingly, the differential mode loss of the REIN filter 210 is less than 1.0 dB at frequencies up to 100 MHz, less than 2.0 dB for frequencies between 100 MHz and 200 MHz, and the common mode loss of the REIN filter 210 is at least 20 dB between 200 kHz and 20 MHz. The differential mode impedance provided by the REIN filter is approximately 1000.

So as to avoid the problem of accessing customer premises, the electric filtering device 200 is configured to couple to the external (i.e. outdoor) DP 130 of the fixed-access telecommunications network 100. Accordingly, the electric filtering device 200 is adapted to tolerate outdoor environmental conditions. In particular, the REIN filter 210 is capable of continuing to operate in outdoor conditions, including at temperatures between −20° C. and +60° C. and an atmospheric humidity between 0% and 100%.

However, the bundling of telecommunications cables together in close proximity, for example as part of the distribution-side cables 145 of the DP 130, may cause a particular telecommunication cable that is transmitting REIN to induce such REIN into the other telecommunications cables that are in close proximity. As a result, the electric filtering device 200 is connected to the telecommunications network so as to filter-out REIN before it reaches a bundle of telecommunications cables, such as the distribution-side cables 145. Accordingly, the electric filtering device 200 is connected to the dropwire 140-1 that is suffering from REIN.

To do so, the REIN filter 210 is provided with electrical contacts 220 for connecting the REIN filter 210 to the telecommunication network 100, and comprises a first electrical contact 220-1 for electrically interfacing with the dropwire 140-1 and a second electrical contact 220-2 for electrically interfacing with the distribution-side cable 145. In particular, the electrical contacts 220 are configured electrically to couple and mechanically to engage with a pair of TMP wires. In one example, the electrical contacts 220 are in the form of crimp connectors.

The REIN filter 210 is capable of operating at voltages corresponding to that which is typically carried by the dropwires 140, which varies between approximately 5V to 100V DC or AC (at approximately 20 Hz), as well as at currents up to 500 mA.

The REIN filter 210 is fastened to the enclosure by means of an engagement 240, thereby to limit or to prevent displacement of the REIN filter 210, owing to, for example, weather conditions or vibration due to traffic.

The enclosure 230 is provided to shield the REIN filter 210 and the electrical contacts 220 from the environment, as well as to offer mechanical protection.

The enclosure comprises a main body 230-1 and a lid 230-2 that is openable, and in this example the lid is detachable from the main body, thereby to allow access to the REIN filter 240, and in particular to the electrical connectors 220. The main body 230-1 and the lid 230-2 are arranged so as to mate in a way that provides a waterproof seal (e.g. by means of a labyrinthine seal) and a locking member (not shown) is provided as part of the enclosure so as sealingly to engage the lid with the main body (e.g. so as to compress a sealing member, also not shown).

So as to facilitate connections between the electrical contacts 220 and the dropwire 140-1 and the distribution-side cable 145, the enclosure is provided with an input 250-1 and an output 250-2 in the form of apertures that are suitably dimensioned to receive the dropwire 140-1 and the distribution-side cable 145. The input 250-1 and output 250-2 are provided with a sealina member (not shown) so as to seal the apertures when the dropwire 140-1 and the distribution-side cable 145 are received by the input 250-1 and output 250-2. For example, the sealing member is in the form of a washer.

In order further to protect the internal components of the electric filtering device 200, the enclosure is formed of a material that is UV-resistant, at least to the extent that the enclosure is free from cracking, embrittlement, warping or shrinkage for a suitable lifetime (e.g. at least 1,000 hours) as per International Electrotechnical Commission specification 68-2-9 (the contents of which are herein incorporated by reference).

Furthermore, the material of the enclosure is also thermally stable at high temperatures (up to 110° C.), low temperatures (down to −20° C.) and temperature fluctuations, for example to the extent that the enclosure is free from cracking, embrittlement, warping or shrinkage when thermally aged at (70±5°) C. for at least 1,000 hours and/or following 3-7 cycles of 30 minutes at (110±5°) C. followed by 15 minutes in ice water at (0±5°) C. (with the transition from oven to ice water not exceeding around 30 seconds).

The enclosure is formed so as to be water resistant or waterproof to an extent that prevents ingress of water into the enclosure and into contact with the REIN filter, for example to an extent that is compliant with International Electrotechnical Commission specification 60068-2-18 (the contents of which are herein incorporated by reference), and in particular Test 'R', Method 'Rc1'.

In one example, the enclosure is formed from plastic (and in particular a high-density plastic), metal or a composite material.

To allow the electric filtering device 200 to be coupled to the DP 130, the electric filtering device is provided with a coupling formation 260. The coupling formation 260 is adapted to fix the electric filtering device 200 to the DP 130. In one example, the coupling formation 260 is also adapted to support the weight of at least a part of the input dropwire 140-1. For example, the coupling formation 260 is in the form of a: cable; cable tie; clip; screw and/or bolt fixture; clamp; and/or hook.

Alternatives and Modifications

In an alternative, the electric filtering device 200 is available to be used to isolate the telecommunications network from a source of REIN interference.

In an alternative example, customer premises 160-1 is the source of REIN interference, and the electronic filtering device is installed along the dropwires that serves customer premise 160-1, thereby to filter out REIN from customer premise 160-1 that is causing interference on the dropwires associated with customer premises 160-2 and/or 160-3.

In an alternative, the DP 130 is in the form of an underground vault, rather than a telephone pole.

In an alternative the REIN filter 210 is replaced by a SHINE filter where the electric filtering device 200 is intended to mitigate SHINE.

In one example, the electric filtering device 200 is available to be installed so as to intercept a telecommunications cable between a junction box 150 and the dropwire 140 that is input into the junction box 150, and fixed to, for example, the junction box or customer's premises (such as the eaves).

Each feature disclosed in the description, and (where appropriate) the claims and drawings may be provided independently or in any appropriate combination.

Reference numerals appearing in the claims are by way of illustration only and shall have no limiting effect on the scope of the claims.

The invention claimed is:

1. An electric filtering device for filtering Repetitive Electrical Impulse Noise (REIN) in a fixed-access telecommunications network, the electric filtering device comprising:
    a REIN filter, said REIN filter comprising a first electrical contact and a second electrical contact for connecting to a telecommunications cable of the fixed-access telecommunications network;
    an enclosure for enclosing the REIN filter;
    an input and an output, formed as part of the enclosure, each for receiving a telecommunications cable so as to be connected to the first and the second electrical contacts, thereby to connect the REIN filter to the fixed-access telecommunications network; and
    a coupling formation for coupling the electric filtering device to an external distribution point for a telecommunications cable of the fixed-access telecommunications network.

2. An electric filtering device according to claim 1, wherein the external distribution point is a telecommunications pole.

3. An electric filtering device according to claim 1, wherein the first and/or the second electrical contact/s is/are configured to couple with a twisted metal pair wire.

4. An electric filtering device according to claim 1, wherein the telecommunications cable is in the form of a dropwire.

5. An electric filtering device according to claim 1, wherein the input and the output are in the form of apertures, and wherein the input and the output each further comprise a seal for sealing the apertures when having received a telecommunications cable.

6. An electric filtering device according to claim 1, wherein the REIN filter is operable at a DC voltage of up to 60 Volts and a current of up to 350 milliAmps.

7. An electric filtering device according to claim 1, wherein the input and/or the output further comprise/s an electrical connector, and wherein each electrical connector is electrically connected to the first or second electrical contact.

8. An electric filtering device according to claim 1, further comprising an anchor point for tethering a strength member of a telecommunications cable.

9. An electric filtering device according to claim 1, wherein the input and the output are arranged on distal sides of the enclosure.

10. An electric filtering device according to claim 1, wherein the first electrical contact is arranged to receive a telecommunications cable from a customer premises; and wherein the second electrical contact is arranged to receive a telecommunications cable from a distribution-side cable of the fixed-access telecommunications network.

11. An electric filtering device according to claim 1, wherein the first electrical contact and the second electrical contact are arranged on distal sides of the REIN filter.

12. An electric filtering device according to claim 1, wherein the enclosure is in the form of a waterproof enclosure.

13. An electric filtering device according to claim 1, wherein the enclosure comprises two separable parts, and wherein said parts comprise complementary engagements for engaging said two separable parts together.

14. An electric filtering device according to claim 1, wherein the enclosure further comprises a mechanical shock-absorbing member for protecting the REIN filter from mechanical shock.

15. An electric filtering device according to claim 1, wherein the enclosure is rigid.

16. An electric filtering device according to claim 1, wherein the enclosure is formed of a UV-resistant material.

17. An electric filtering device according to claim 1, wherein the enclosure is formed of an electrically-insulating material, thereby to prevent electromagnetic induction.

18. An external distribution point for a fixed-access telecommunications network, the external distribution point comprising:
    a customer-side telecommunications cable;
    a distribution-side telecommunications cable; and
    an electric filtering device according to claim 1, wherein the customer-side telecommunications cables is electrically connected to the distribution-side telecommunications cable via said electric filtering device.

* * * * *